United States Patent
Sardesai et al.

(10) Patent No.: US 7,400,835 B2
(45) Date of Patent: Jul. 15, 2008

(54) WDM SYSTEM HAVING CHROMATIC DISPERSION PRECOMPENSATION

(75) Inventors: Harshad Sardesai, Ellicott City, MD (US); Michael Taylor, Laurel, MD (US); Sanjaykumar Upadhyay, Pasadena, MD (US)

(73) Assignee: Ciena Corporation, Linthicum, MD (US)

( * ) Notice: Subject to any disclaimer, the term of this patent is extended or adjusted under 35 U.S.C. 154(b) by 604 days.

(21) Appl. No.: 10/231,893

(22) Filed: Aug. 30, 2002

(65) Prior Publication Data

US 2004/0042799 A1 Mar. 4, 2004

(51) Int. Cl.
*H04B 10/12* (2006.01)
*H04B 10/00* (2006.01)

(52) U.S. Cl. .................. 398/147; 398/148; 398/159

(58) Field of Classification Search ............. 359/337.3, 359/337.5; 398/43, 68, 81, 147, 148, 193, 398/159
See application file for complete search history.

(56) References Cited

U.S. PATENT DOCUMENTS

| | | | |
|---|---|---|---|
| 5,696,614 A | 12/1997 | Ishikawa et al. | 359/124 |
| 5,717,510 A * | 2/1998 | Ishikawa et al. | 398/199 |
| 5,760,937 A * | 6/1998 | Ishikawa et al. | 398/98 |
| 5,875,045 A * | 2/1999 | Sugiyama et al. | 398/94 |
| 6,118,566 A * | 9/2000 | Price | 398/194 |
| 6,137,604 A | 10/2000 | Bergano | 359/124 |
| 6,163,393 A * | 12/2000 | Wu et al. | 398/1 |
| 6,307,985 B1 * | 10/2001 | Murakami et al. | 385/24 |
| 6,356,384 B1 * | 3/2002 | Islam | 359/334 |
| 6,404,948 B2 | 6/2002 | Alexander et al. | 385/24 |
| 6,411,430 B1 * | 6/2002 | Ogino et al. | 359/337.11 |
| 6,519,080 B2 * | 2/2003 | Vavassori et al. | 359/341.31 |
| 6,532,320 B1 * | 3/2003 | Kikuchi et al. | 385/24 |
| 6,603,594 B2 * | 8/2003 | Islam | 359/334 |
| 6,665,497 B1 * | 12/2003 | Hamilton-Gahart et al. | 398/135 |
| 6,721,081 B1 * | 4/2004 | Mauro et al. | 359/279 |
| 6,731,875 B1 * | 5/2004 | Kartalopoulos | 398/68 |
| 6,980,738 B1 * | 12/2005 | Frankel et al. | 398/31 |
| 2002/0015207 A1 * | 2/2002 | Ooi et al. | 359/161 |
| 2002/0018268 A1 * | 2/2002 | Price et al. | 359/161 |
| 2002/0021467 A1 * | 2/2002 | Ofek et al. | 359/128 |
| 2002/0048069 A1 * | 4/2002 | Ibukuro | 359/154 |
| 2002/0051285 A1 * | 5/2002 | Islam | 359/349 |
| 2002/0159131 A1 * | 10/2002 | Bartolini et al. | 359/334 |
| 2003/0002112 A1 * | 1/2003 | Hirano et al. | 359/161 |

(Continued)

OTHER PUBLICATIONS

Yann Frignac, et al., "Numerical Optimization of Pre- and In-line Dispersion Compensation in Dispersion-Managed Systems at 40 Gbit/s," 2000 Optical Society of America.

(Continued)

*Primary Examiner*—M. R. Sedighian
(74) *Attorney, Agent, or Firm*—Clements Bernard Miller; Christopher L. Bernard; Tyler S. Brown (57) ABSTRACT

Chromatic dispersion in a high speed CS-RZ WDM transmission system is reduced by providing tailored "precompensation" for individual and/or groups of optical signals. Such precompensation is achieved by passing the optical signals through a dispersion compensating elements, such as dispersion compensating fiber, within an optical multiplexer, i.e., prior to multiplexing the signals onto a single optical fiber. Additional dispersion compensation can be performed in optical amplifiers and within an optical demultiplexer downstream from the optical multiplexer.

20 Claims, 7 Drawing Sheets

U.S. PATENT DOCUMENTS

| | | | |
|---|---|---|---|
| 2003/0039003 A1* | 2/2003 | Jakobik et al. | 359/115 |
| 2003/0058504 A1* | 3/2003 | Cho et al. | 359/161 |
| 2003/0067655 A1* | 4/2003 | Pedersen et al. | 359/152 |
| 2003/0095324 A1* | 5/2003 | Islam et al. | 359/337.1 |
| 2003/0123884 A1* | 7/2003 | Willner et al. | 398/212 |
| 2004/0057734 A1* | 3/2004 | Igorevich Lakoba | 398/192 |
| 2004/0061922 A1* | 4/2004 | Mauro et al. | 359/279 |
| 2004/0208543 A1* | 10/2004 | Weingarten | 398/47 |
| 2004/0208647 A1* | 10/2004 | Gill et al. | 398/188 |
| 2004/0208648 A1* | 10/2004 | Fishman et al. | 398/189 |

OTHER PUBLICATIONS

Y. Miyamoto, et al., "320 Gbit/s (8×40 Gbit/s) WDM Transmission Over 367km with 120km Repeater Spacing Using Carrier-Supperssed Return-to-Zero Format," Electronics Letters, vol. 35, No. 23, Nov. 1999.

Yutaka Miyamoto, et al., "320 Gbit/s (8×40 Gbit/s) WDM transmission over 367-km zero-dispersion-flattened line with 120-km repeater spacing using carrier-supressed return-to-zero pulse format," OAA, 1999, pp. 4-1- 4-4.

* cited by examiner

WDM SYSTEM HAVING CHROMATIC DISPERSION PRECOMPENSATION

The present invention is directed toward high data rate wavelength division multiplexed (WDM) optical communication systems.

BACKGROUND OF THE INVENTION

Wavelength division multiplexing (WDM) has been explored as an approach for increasing the capacity of fiber optic networks. In a WDM system, plural optical signals or channels are carried over a single optical fiber with each channel being assigned a particular wavelength. Such systems typically include a demultiplexer for separating and supplying the optical channels to corresponding optical receivers.

In order to increase system capacity further, data rates associated with each optical signal have increased. In particular, data rates have increased from 2.5 Gbits/second to 10 Gbits/second in commercially available systems, and 40 Gbits/second per channel systems are currently in development.

At relatively high data rates, such as 40 Gbits/second, different modulation formats have been considered for providing optimal transmission. One such format, known as Carrier Suppressed Return-To-Zero (CS-RZ), has been proposed for transmitting 40 Gib/second optical signals. In accordance with the CS-RZ format, the carrier or central wavelength of an optical signal spectrum is suppressed, while optical signal sidebands in the spectrum carry the transmitted data. CS-RZ optical signals have the advantage that they can be transmitted into fiber spans with a higher channel power than other conventional modulation formats before degradation occurs due to fiber nonlinear effects. See Miyamoto et al., Electronics Letters, vol. 35, no. 23, Nov. 11, 1999, pp. 2041-2042, incorporated by reference herein.

40 Gbit/second CS-RZ signals, however, are susceptible to chromatic dispersion, a non-linear effect in which spectral components of an optical signal propagate through the optical fiber at different speeds with higher frequency components traveling slower than lower frequency components. Chromatic dispersion can result in spectral components of one pulse arriving at a receiver at substantially the same time as a succeeding pulse, thereby causing degraded receiver sensitivity and a relatively high bit error rate.

BRIEF DESCRIPTION OF THE DRAWINGS

Advantages of the present invention will be apparent from the following detailed description of the presently preferred embodiments thereof, which description should be considered in conjunction with the accompanying drawings in which.

DETAILED DESCRIPTION

Chromatic dispersion in a high speed CS-RZ WDM transmission system is reduced by providing tailored "precompensation" for individual and/or groups of optical signals. Such precompensation is achieved by passing the optical signals through a dispersion compensating fiber or other dispersion compensating element prior to multiplexing the signals onto a single optical fiber. Additional dispersion compensation can be performed in optical amplifiers and within an optical demultiplexer downstream from the optical multiplexer.

Figure 1:
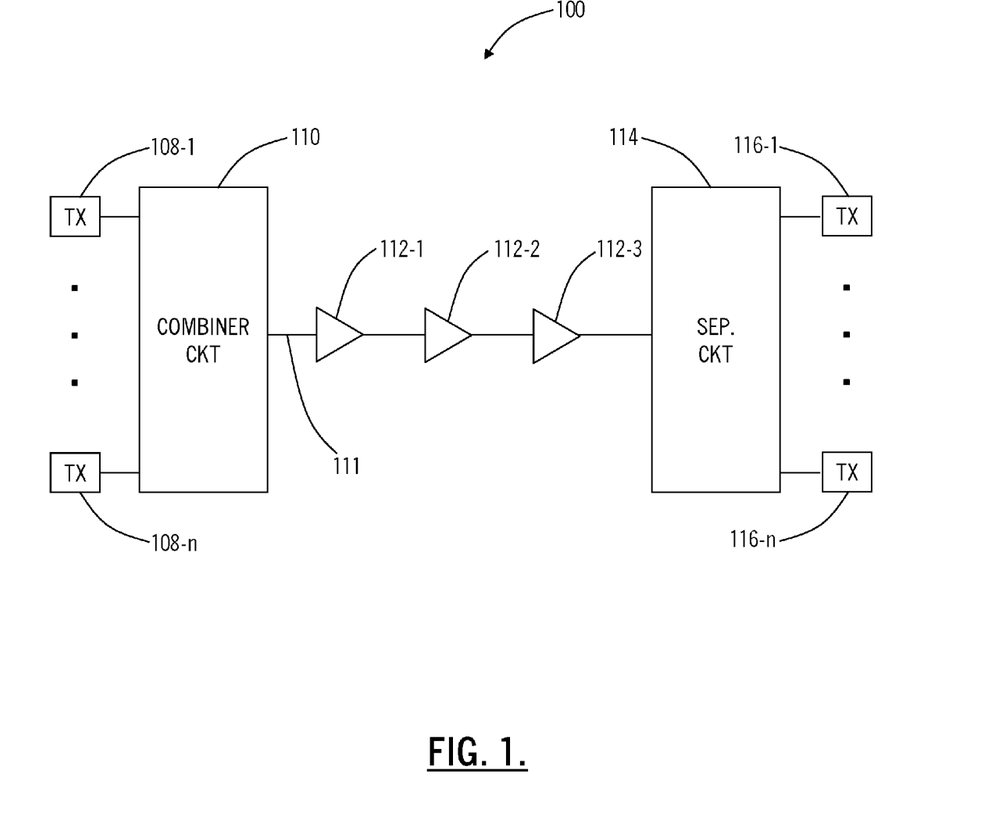
FIG. 1 illustrates a WDM optical communication system consistent with an aspect of the present invention.

FIG. 1 illustrates WDM system 100 consistent with an aspect of the present invention. WDM system 100 includes an optical combiner circuit 110, which receives a plurality of optical signals from transmitters 108-1 to 108-*n*, and combines the optical signals onto an optical communication path 111. The optical signals often carry data at rates of 40 Gbits/second conforming to SDH STM-256 and/or SONET OC-768 protocols. The optical signals next pass through a plurality of optical amplifiers 112-1 to 112-3, which optically boost the power of the optical signals to facilitate greater propagation distances. Although three optical amplifiers are shown in FIG. 1, it is understood that any appropriate number of optical amplifiers can be included in system 100. At an end portion of system 100, the optical signals are supplied to separation circuit 114. Individual optical signals are supplied to respective optical receiver circuits 116-1 to 116-*n* for conversion to corresponding electrical signals and further processing.

Figure 2:
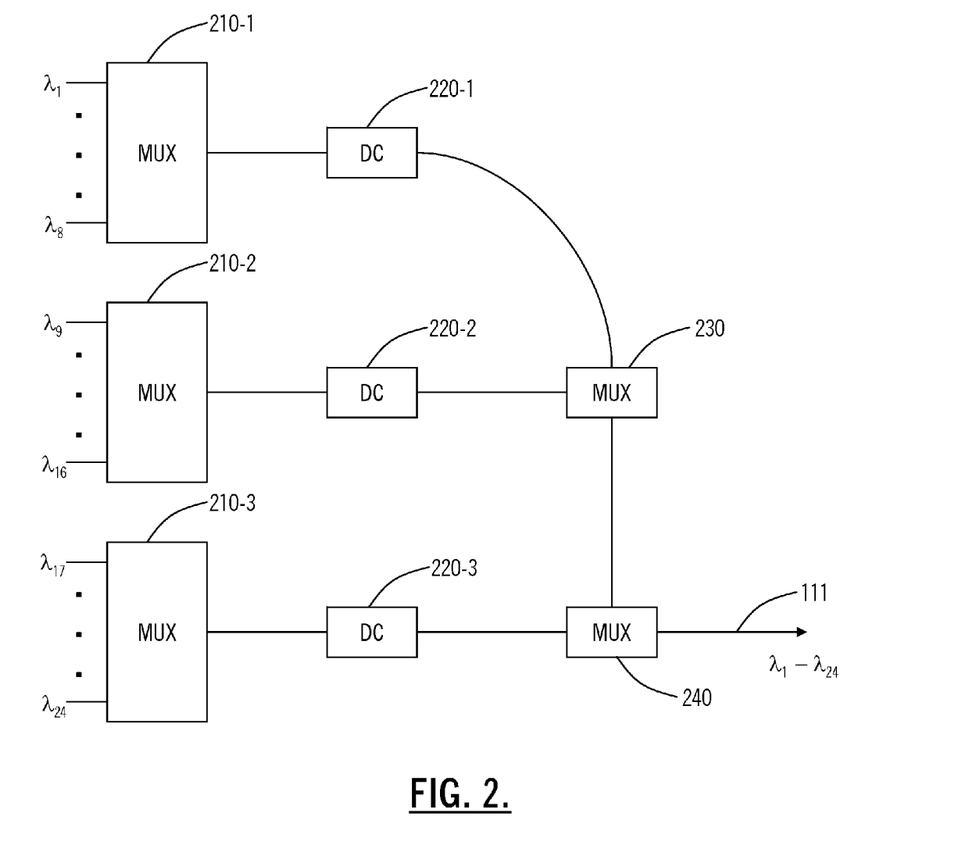
FIG. 2 illustrates a combining circuit consistent with an aspect of the present invention.

Combiner circuit 110 is shown in greater detail in FIG. 2. Combiner circuit includes a plurality of conventional optical multiplexers 210-1 to 210-3, each of which receving a plurality of optical signals. The optical signals each have a corresponding one of a plurality of wavelengths. In the example shown in FIG. 2, multiplexer 210-1 receives optical signal wavelengths $\lambda_1$ to $\lambda_8$, multiplexer 210-2 receives optical signals at wavelengths $\lambda_9$ to $\lambda_{16}$, and multiplexer 210-3 receives optical signals at wavelengths $\lambda_{17}$ to $\lambda_{24}$. The outputs of multiplexers 210-1 to 210-3, typically including at least one segment of optical fiber, are coupled to respective dispersion compensating elements 220-1 to 220-3. The dispersion compensating elements provide tailored dispersion compensation for each optical signal grouping. After passing through the elements 220-1 and 220-2, optical signals at wavelengths $\lambda_1$ to $\lambda_8$ and $\lambda_9$ to $\lambda_{16}$ are supplied to mutiplexer 230, and then combined with optical signals $\lambda_{17}$ to $\lambda_{24}$ output from multiplexer 220-3 by multiplexer 240. The output of optical multiplexer 240 is coupled to optical communication path 111, including for example, an optical fiber.

Although 24 optical signals are multiplexed in FIG. 2, it is understood that additional or fewer multiplexers could be provided to multiplex any appropriate number of optical signals, as desired. In addition, although eight-input multiplexers are shown in FIG. 2, other conventional multiplexers having different numbers of inputs could be implemented to combine multiple optical signals. Exemplary optical multiplexer and combining circuitry configurations are described in U.S. Pat. No. 6,404,948, incorporated by reference herein.

Figure 3:
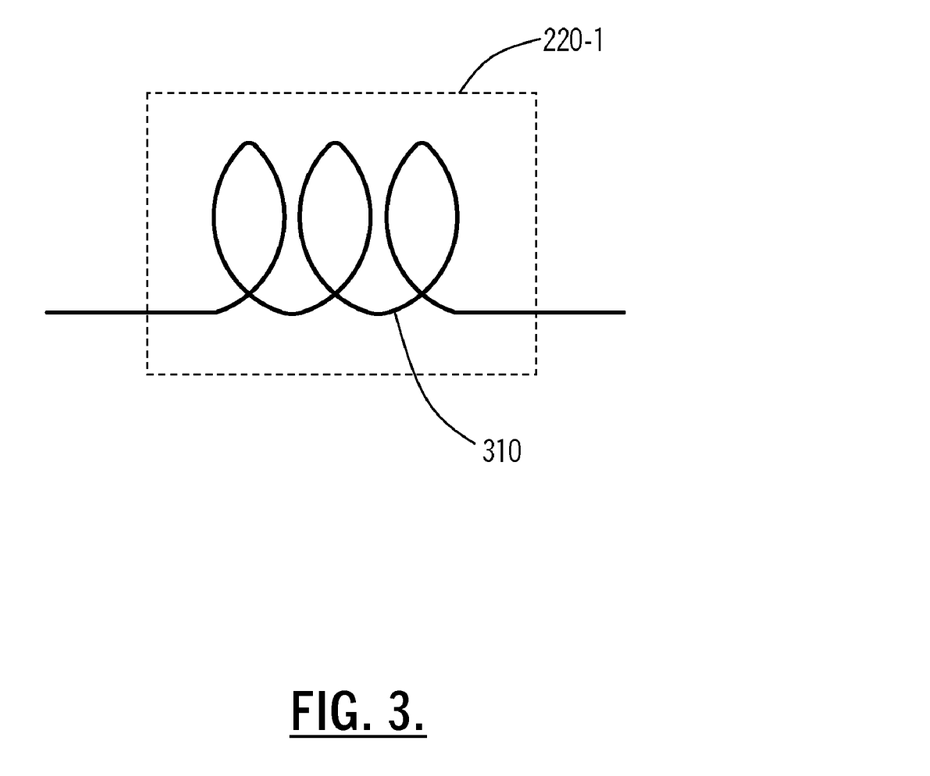
FIG. 3 illustrates an exemplary dispersion compensation element.

FIG. 3 illustrates dispersion compensating element 220-1 in greater detail. Typically, dispersion compensating elements 220-2 and 220-3 have a similar structure, but provide differing amounts of dispersion compensation depending upon the wavelengths of the optical signals supplied thereto. Optical element 220-1 typically includes a segment of dispersion compensating fiber 310 cut to a particular length to provide a desired amount of dispersion compensation. Alternatively, combinations of dispersion compensating fibers having the same or opposite signs of dispersion can be coupled to one another to provide a desired amount of dispersion compensation, as discussed in greater detail in U.S. patent application Ser. No. 09/551,131 filed Apr. 17, 2000 entitled "Dispersion Compensation Module", and U.S. Pat. No. 6,259,845, both of which are incorporated by reference herein.

Although dispersion compensating fiber may often be used as a dispersion compensating element, other known dispersion compensating elements are contemplated, such as fiber Bragg grating based dispersion compensators, etalon filters, and higher order mode dispersion compensators. Moreover, additional dispersion compensating elements may be concatenated with one of more additional dispersion compensating elements in one or all of combiner circuit 110, amplifiers 112 and separation circuit 114 to achieve a desired level of dispersion compensation. For example, fiber Bragg gratings are typically used as single channel dispersion compensating elements, but multiple fiber Bragg gratings can be used with multi-port circulators for simultaneous multi-channel compensation.

Figure 4:
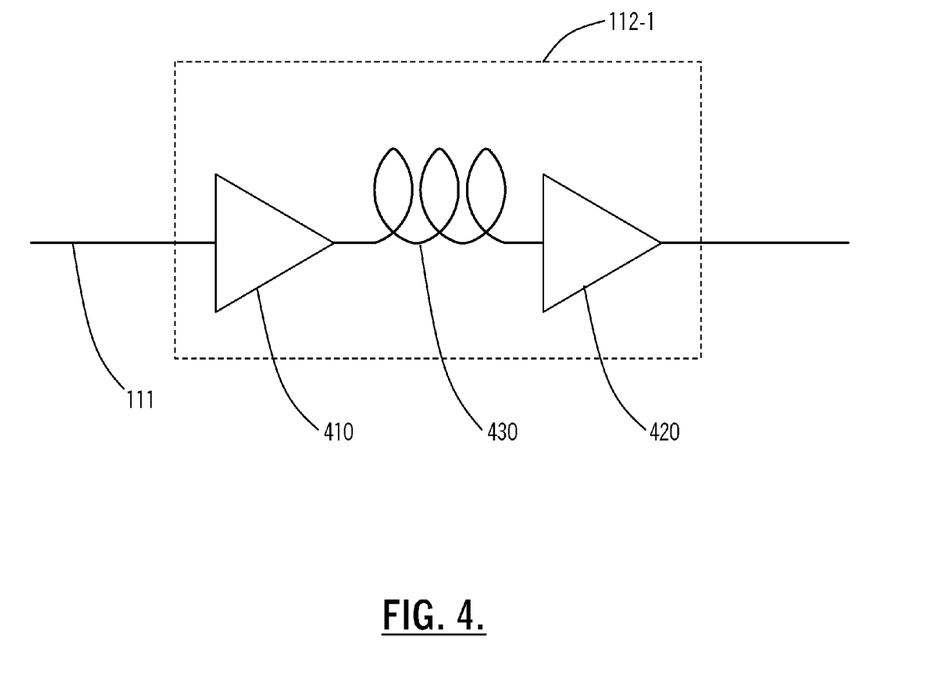
FIG. 4 illustrates an exemplary optical amplifier configuration.

As noted above, further dispersion compensation can be achieved by including dispersion compensating elements in one or more of optical amplifiers 112-1 to 112-3. FIG. 4 illustrates an exemplary configuration of an optical amplifier, in this instance optical amplifier 112-1, which also provides dispersion compensation. Optical amplifier 112-1 includes first and second amplification stages 410 and 420 that provide gain to optical signals applied thereto. Each amplification stage typically includes at least one segment of erbium doped optical fiber and one or more pump lasers that supply light at either 980 nm, 1480 nm or both, to the erbium doped fiber, provided that the optical signals to be amplified have wavelengths within a narrow range about 1550 nm.

As further shown in FIG. 4, a dispersion compensating element, such as dispersion compensating fiber 430, can be coupled between stages 410 and 420, if desired. Other known dispersion compensating elements, however, could be implemented in amplifier 112-1, including, for example, fiber Bragg gratings, as well as other dispersion compensating elements discussed above. Optical amplifier configurations are further described in U.S. Pat. No. 6,061,171, incorporated by reference herein.

Figure 5:
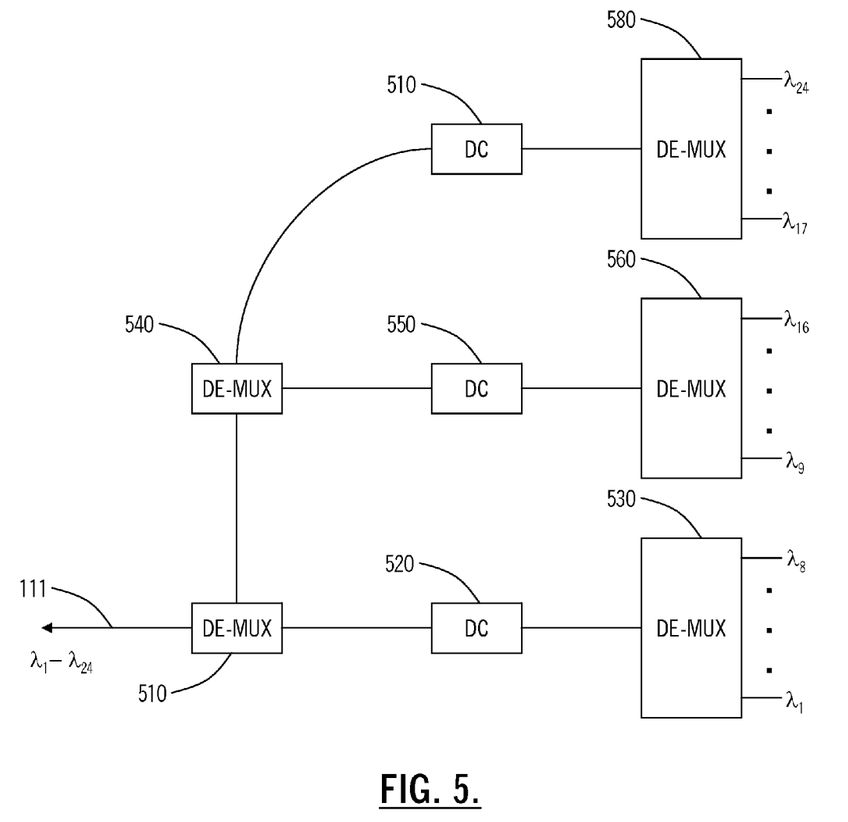
FIG. 5 illustrates an exemplary separation circuit.

Additional dispersion compensation can be provided in separation circuit 114, which is shown in greater detail in FIG. 5. Separation circuit 114 includes an optical demultiplexer circuit 510 coupled to optical communication path 111 that receives optical signals at wavelengths $\lambda_1$ to $\lambda_{24}$. Demultiplexer 510 supplies optical signals having wavelengths $\lambda_1$ to $\lambda_8$ to dispersion compensating element 520, which, in turn, provides tailored chromatic dispersion compensation for these signals, and passes the signals to demultiplexer 530, which outputs each optical signal on a separate line.

Demultiplexer 510 also supplies optical signals having wavelengths $\lambda_9$ to $\lambda_{24}$ to demultiplexer 540, which directs optical signals having wavelengths $\lambda_9$ to $\lambda_{16}$ to dispersion compensating element 550, while forwarding the remaining wavelengths to dispersion compensating element 570. Dispersion compensating element 550 provides tailored compensation for these signals, and pass the signals to signal demultiplexer 560. Individual optical signals having wavelengths $\lambda_9$ to $\lambda_{16}$ are then output from demultiplexer 560.

Remaining optical signals having wavelengths $\lambda_{17}$ to $\lambda_{24}$ are compensated by dispersion compensating element 570 and then demultiplexed by demultiplexer 580. Each of dispersion compensating elements 520, 550 and 570 typically include one or more sections of dispersion compensating fiber to provide tailored compensation to the optical signals supplied thereto. Moreover, elements 520, 550 and 570 have a structure similar to that shown in FIG. 3. Instead of dispersion compensating fiber, other dispersion compensating elements may be used, such as fiber Bragg gratings, as well as other dispersion compensating elements discussed above.

Figure 6:
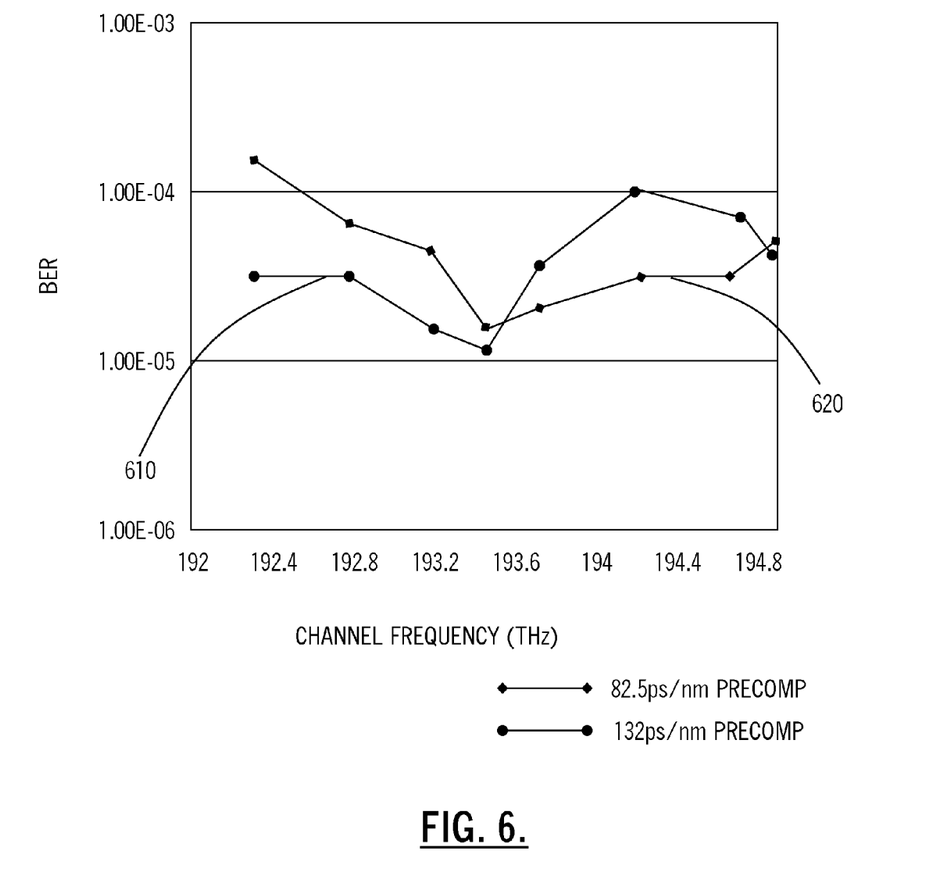
FIG. 6 illustrates plots of BER values verses channel frequency for different precompensation values.

An advantage of the present invention will next be described with reference to FIG. 6, which illustrates plots of bit error rate (BER) versus channel frequency (related to wavelength). Curve 620 represents optimal BER values at particular optical signal or channel frequencies when 82.5 ps/nm of dispersion precompensation is provided, while curve 610 represents optimal BER values at particular channel frequencies with a precompensation of 132 ps/nm. The optimal BER values were measured by varying the amount of dispersion compensation in channel separating circuit 114.

A refractive index of an optical fiber is a ratio of the speed of light in the fiber to the speed of light in a vacuum. The refractive index can be represented by a formula having a linear component and a nonlinear component. If the nonlinear component is equal to zero, as it is often treated, a transmission system exhibits linear behavior, and chromatic dispersion behaves as a cumulative effect. In which case, chromatic dispersion can be offset by introducing additional dispersion equal in magnitude but opposite in sign to the accumulated dispersion at any location in the system. For example, the additional dispersion could be lumped into a single network element or distributed among several network elements in a system and is often expected to yield the same BER values. Accordingly, assuming a system to be linear, the same BER values presumably could be obtained with or without precompensation, so long as the aggregate amount of compensation is the same. The results shown in FIG. 6, however, indicate that precompensation with an appropriate amount of dispersion yields lower BER values than without such precompensation, even though the aggregate amount of compensation may be the same in each case. These results are believed to be a consequence of the non-linear refractive index of the transmission fiber. Moreover, these results indicate that precompensation is typically wavelength or frequency dependant and it is often better to tailor the precompensation, such that for given bands or groupings of optical signals, a preferred amount of dispersion precompensation is provided. For example, it is noted that better, i.e., lower, BER values were obtained for frequencies between about 192 THz and 193.6 THz with 132 ps/nm of precompensation, whereas 82.5 ps/nm of precompensation yielded lower BER values in the range of about 193.6 THz to just under 194.8 THz.

Figure 7:
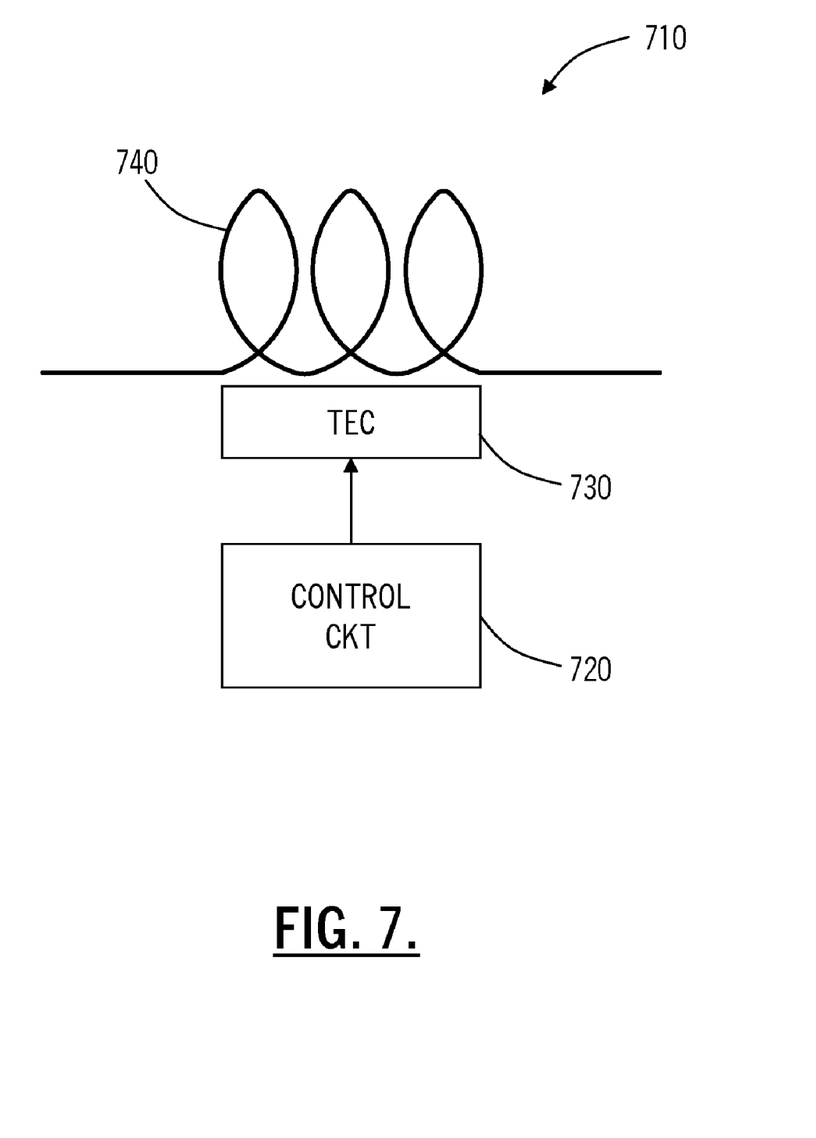
FIG. 7 illustrates a variable dispersion compensation element.

While the foregoing invention has been described in terms of the embodiments discussed above, numerous variations are possible. For example, as shown in FIG. 7, a tunable dispersion compensating element 710 can be provided in addition to or in place of dispersion compensating elements 220-2 to 220-3, as well as other dispersion compensating elements in system 100 including dispersion compensating elements 520, 550 and 570 in separation circuit 114. As further shown in FIG. 7, a control circuit 720 generates a control signal, which is used to adjust the temperature of a conventional thermo-electric cooler (TEC) 730. TEC 730 is thermally coupled to a segment of dispersion compensating fiber 740 such that changes of temperature of fiber 740 in response to the control signal result in corresponding changes in dispersion of element 710. When adjusting the dispersion associated with element 710 in combiner circuit 110, corresponding changes in dispersion in one or more dispersion compensating elements in separation circuit 114 are often required. Since dispersion often changes slowly, signal quality measurements such as BER could be measured downstream and control information could be communication through a service channel or through element management software to an upstream variable dispersion compensating element.

Other known variable dispersion compensation elements could be implemented as well, such as fiber Bragg grating based dispersion compensating elements have a dispersion that varies in response to a mechanical stress placed on the gratings. Other modifications and changes such as those suggested above, but not limited thereto, are considered to be within the scope of the following claims.

What is claimed is:

1. An optical communication device, comprising:
a first multiplexer having a plurality of inputs and an output, each of said plurality of inputs receiving a respective one of a first plurality of optical signals, each of said first plurality of optical signals having a corresponding one of a first plurality of wavelengths, each of said first plurality of optical signals conforming to a CS-RZ modulation format;
a variable dispersion compensating element coupled to said output, said variable dispersion compensating element being configured to provide tailored dispersion compensation for said first plurality of optical signals, and said output supplying said first plurality of optical signals to said first dispersion compensating element;
a second multiplexer having a plurality of inputs and an output, each of said plurality of inputs of said second multiplexer receiving a respective one of a second plurality of optical signals, each of said second plurality of optical signals having a corresponding one of a second plurality of wavelengths; and
a third multiplexer having a first input, a second input and an output, said first input being coupled to said dispersion compensating element and receiving said first plurality of optical signals, said second input being coupled to said output of said second multiplexer and receiving said second plurality of optical signals, and said output carrying said first and second pluralities of optical signals;
a control circuit, said control circuit being configured to generate a control signal to adjust a temperature of a thermoelectric cooler, said thermoelectric cooler being coupled to said variable dispersion compensation element, which is adjusted in response to said control signal, wherein said control signal is responsive to measured downstream bit error rate;
wherein said optical communication device is a combiner circuit;
wherein the first plurality of wavelengths comprise a wavelength grouping with each of the first plurality of wavelengths located adjacent to another of the first plurality of wavelengths in the wavelength grouping, and wherein none of the second plurality of wavelengths are located within the wavelength grouping;
wherein the tailored dispersion compensation for said first plurality of optical signals is responsive to the wavelengths in the wavelength grouping;
wherein said dispersion compensation element is located between said first multiplexer and said third multiplexer within the combiner circuit; and
wherein said first plurality of optical signals has been provided with selective dispersion compensation prior to being multiplexed with said second plurality of optical signals onto an optical communication path comprising an optical fiber and prior to exiting the combiner circuit.

2. An optical communication device in accordance with claim 1, wherein the second plurality of wavelengths comprise a second wavelength grouping with each of the second plurality of wavelengths located adjacent to another of the second plurality of wavelengths in the second wavelength grouping, wherein none of the first plurality of wavelengths are located within the second wavelength grouping;
wherein said wavelength grouping is a first wavelength grouping;
wherein said dispersion compensating element is a first dispersion compensating element, said optical communication device further comprising a second dispersion compensating element coupled to said output of said second multiplexer and said second input of said third multiplexer, said second dispersion compensating element being configured to receive said second plurality of optical signals from said output of said second multiplexer and supply said second plurality of optical signals to said second input of said third multiplexer, wherein said second plurality of optical signals has been provided with selective dispersion compensation responsive to the wavelengths in the second wavelength grouping prior to being multiplexed with said first plurality of optical signals onto said optical communication path.

3. An optical communication device in accordance with claim 1, wherein said dispersion compensating element includes a segment of dispersion compensating fiber.

4. An optical communication device in accordance with claim 1, wherein said output of said third multiplexer is configured to be coupled to said optical communication path, said optical communication device further comprising a plurality of optical amplifiers coupled to said optical communication path, each of said plurality of optical amplifiers including a dispersion compensating element.

5. An optical communication device in accordance with claim 4, wherein said dispersion compensating element is a first dispersion compensating element, said optical communication device further comprising:
a first demultiplexer having an input coupled to said optical communication path, and first and second outputs, said first output of said first demultiplexer supplying said first plurality of optical signals and said second output of said first demultiplexer supplying said second plurality of optical signals;
a second dispersion compensating element coupled to said first output of said first demultiplexer;
a second demultiplexer having an input coupled to said second dispersion compensating element, and having a plurality of outputs; and
a third demultiplexer having an input coupled to said second output of said first demultiplexer, and having a plurality of outputs, wherein said first plurality of optical signals has been provided with selective dispersion compensation subsequent to being demultiplexed with said second plurality of optical signals.

6. An optical communication device in accordance with claim 1, wherein at least one of said first plurality of optical signals carries information at a rate substantially equal to 40 Gbits/sec.

7. An optical communication device in accordance with claim 1, wherein data contained in at least one of said first plurality of optical signals conforms to a SONET OC-768 protocol.

8. An optical communication device in accordance with claim 1, wherein data contained in at least one of said first plurality of optical signals conforms to an SDH OC-768 protocol.

9. An optical communication device in accordance with claim 1, wherein predetermined optical signals of said first plurality of optical signals have been provided with dispersion compensation prior to being multiplexed with said second plurality of optical signals onto said optical communication path.

10. An optical communication device, comprising:
a first plurality of optical signals in a first wavelength grouping, wherein the first wavelength grouping comprises each of the first plurality of optical signals located substantially adjacent to another of the first plurality of optical signals in the first wavelength grouping;
a first variable dispersion compensating element receiving the first plurality of optical signals, said first variable dispersion compensating element being configured to provide tailored dispersion compensation responsive to the first wavelength grouping for said first plurality of optical signals, at least one of said first plurality of optical signals conforming to a CS-RZ modulation format;
a second plurality of optical signals in a second wavelength grouping, wherein the second wavelength grouping comprises each of the second plurality of optical signals located substantially adjacent to another of the second plurality of optical signals in the second wavelength grouping;
a second variable dispersion compensating element receiving the second plurality of optical signals, said second variable dispersion compensating element being configured to provide tailored dispersion compensation responsive to the second wavelength grouping for said second plurality of optical signals; and
a multiplexer configured to receive said first and second pluralities of optical signals at respective first and second inputs, said multiplexer being configured to supply said first and second pluralities of optical signals at an output;
a control circuit, the control circuit being configured to generate a control signal to adjust a temperature of a thermoelectric cooler, said thermoelectric cooler being coupled to one or more of said first and second variable dispersion compensation elements, which is adjusted in response to said control signal, wherein said control signal is responsive to measured downstream bit error rate;
wherein said optical communication device is a combiner circuit;
wherein said dispersion compensation elements are located before said multiplexer within the combiner circuit;
wherein said first and second pluralities of optical signals have been provided with selective dispersion compensation responsive to the first and second wavelength groupings prior to being multiplexed with one another onto an optical communication path comprising an optical fiber and prior to exiting the combiner circuit; and
wherein none of the second plurality of optical signals are located within the first wavelength grouping and none of the first plurality of optical signals are located within the second wavelength grouping.

11. An optical communication device in accordance with claim 10, wherein both said first and second dispersion compensating elements include a segment of dispersion compensation optical fiber.

12. An optical communication device in accordance with claim 10, wherein said output of said multiplexer is configured to be coupled to said optical communication path, said optical communication device further comprising a plurality of optical amplifiers coupled to said optical communication path, each of said plurality of optical amplifiers including a respective one of a plurality of dispersion compensating elements.

13. An optical communication device in accordance with claim 12, further comprising:
a first demultiplexer having an input coupled to said optical communication path, and first and second outputs, said first output of said first demultiplexer supplying said first plurality of optical signals and said second output of said first demultiplexer supplying said second plurality of optical signals;
a third dispersion compensating element coupled to said first output of said first demultiplexer;
a second demultiplexer having an input coupled to said third dispersion compensating element, and having a plurality of outputs; and
a third demultiplexer having an input coupled to said second output of said first demultiplexer, and having a plurality of outputs, wherein said first plurality of optical signals has been provided with selective dispersion compensation subsequent to being demultiplexed with said second plurality of optical signals.

14. An optical communication device in accordance with claim 10, wherein at least one of said first plurality of optical signals carries information at a rate substantially equal to 40 Gbits/sec.

15. An optical communication device in accordance with claim 10, wherein data contained in at least one of said first plurality of optical signals conforms to a SONET OC-768 protocol.

16. An optical communication device in accordance with claim 10, wherein data contained in at least one of said first plurality of optical signals conforms to an SDH OC-768 protocol.

17. An optical communication device in accordance with claim 10, wherein predetermined optical signals of said first and second pluralities of optical signals have been provided with dispersion compensation prior to being multiplexed with one another onto said optical communication path.

18. An optical communication device, comprising:
a first optical transmitter supplying a first optical signal having a first wavelength, said first optical signal conforming to a CS-RZ modulation format;
a second optical transmitter supplying a second optical signal having a second wavelength, said second optical signals conforming to said CS-RZ modulation format;
a variable dispersion compensating element coupled to said first optical transmitter, said variable dispersion compensating element being configured to provide tailored dispersion compensation responsive to the first wavelength, and said dispersion compensating element being configured to pass said first optical signal; and
a multiplexer having a first input coupled to said dispersion compensating element and receiving said first optical signal, a second input coupled to said second optical transmitter and receiving said second optical signal, and an output, said optical multiplexer supplying said first and second optical signals to said output;
a control circuit, the control circuit being configured to generate a control signal to adjust a temperature of a thermoelectric cooler, said thermoelectric cooler being coupled to said variable dispersion compensation element, which is adjusted in response to said control signal, wherein said control signal is responsive to measured downstream bit error rate;

wherein said optical communication device is a combiner circuit;

wherein said dispersion compensation element is located between said first optical transmitter and said multiplexer within the combiner circuit; and wherein said first optical signal has been provided with dispersion compensation prior to being multiplexed with said second optical signal onto an optical communication path comprising an optical fiber and prior to exiting the combiner circuit.

19. An optical communication device in accordance with claim 18, wherein said dispersion compensating element is a first dispersion compensating element, said optical communication device further comprising a second dispersion compensating element coupled to said second optical transmitter, said second dispersion compensating element being configured provide tailored dispersion compensation responsive to the second wavelength and to pass said second optical signal, wherein said second optical signal has been provided with dispersion compensation prior to being multiplexed with said first optical signal onto said optical communication path.

20. An optical communication device in accordance with claim 19, wherein each of said first and second dispersion compensating elements includes a segment of dispersion compensating fiber.

* * * * *